(12) United States Patent
Zha et al.

(10) Patent No.: US 11,492,544 B2
(45) Date of Patent: *Nov. 8, 2022

(54) CHEMICAL PRODUCTS FOR ADHESIVE APPLICATIONS

(71) Applicant: Hexion Inc., Columbus, OH (US)

(72) Inventors: Charles Zha, Katy, TX (US); Jan Beetge, Pearland, TX (US)

(73) Assignee: HEXION INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,195

(22) Filed: Oct. 11, 2017

(65) Prior Publication Data
US 2018/0030339 A1    Feb. 1, 2018

Related U.S. Application Data

(63) Continuation-in-part of application No. 15/629,130, filed on Jun. 21, 2017.
(Continued)

(51) Int. Cl.
| | |
|---|---|
| *C09K 8/80* | (2006.01) |
| *C08G 73/02* | (2006.01) |
| *C09J 133/02* | (2006.01) |
| *C09J 133/06* | (2006.01) |
| *C09J 133/24* | (2006.01) |
| *C09J 179/02* | (2006.01) |

(Continued)

(52) U.S. Cl.
CPC ............ *C09K 8/805* (2013.01); *C08G 73/024* (2013.01); *C08G 73/028* (2013.01); *C09J 133/02* (2013.01); *C09J 133/068* (2013.01); *C09J 133/24* (2013.01); *C09J 179/02* (2013.01); *C09K 8/68* (2013.01); *C09K 8/685* (2013.01); *C09K 8/70* (2013.01); *C09K 8/725* (2013.01); *E21B 43/267* (2013.01); *C09K 8/5751* (2013.01); *C09K 8/5756* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 4,086,197 | A | 4/1978 | Bouche et al. |
| 4,229,563 | A | 10/1980 | Foscante et al. |

(Continued)

FOREIGN PATENT DOCUMENTS

| | | | | |
|---|---|---|---|---|
| CN | 103450471 A | * | 12/2013 | |
| EP | 0386550 A1 | * | 9/1990 | .......... B01F 17/0042 |

(Continued)

*Primary Examiner* — Randy P Gulakowski
*Assistant Examiner* — Ha A Nguyen

(57) ABSTRACT

The embodiments described herein generally relate to methods and chemical compositions for fracturing fluid applications. In one embodiment, a fracturing fluid composition is provided comprising a fracturing fluid and an additive composition including a reaction product of a diglycidyl ether or a polyacid selected from the group consisting of an aromatic polyacid, an aliphatic polyacid, an aliphatic polyacid with an aromatic group, and combinations thereof; and a polyamine; and one or more compounds selected from the group consisting of a branched aliphatic acid, a cyclic aliphatic acid with a cyclic aliphatic group, a linear aliphatic, and combinations thereof.

11 Claims, 2 Drawing Sheets

Related U.S. Application Data

(60) Provisional application No. 62/353,444, filed on Jun. 22, 2016.

(51) Int. Cl.
    *C09K 8/68* (2006.01)
    *C09K 8/70* (2006.01)
    *C09K 8/72* (2006.01)
    *E21B 43/267* (2006.01)
    *C09K 8/575* (2006.01)
    *C08L 33/02* (2006.01)

(56) References Cited

U.S. PATENT DOCUMENTS

| | | |
|---|---|---|
| 4,946,933 A | 8/1990 | Speranza et al. |
| 5,775,425 A | 7/1998 | Weaver et al. |
| 5,853,048 A | 12/1998 | Weaver et al. |
| 5,871,049 A | 2/1999 | Weaver et al. |
| 6,258,920 B1 * | 7/2001 | Starner .............. C08G 59/54 252/182.26 |
| 7,745,006 B2 | 6/2010 | Barker |
| 2005/0194135 A1 | 9/2005 | Nguyen et al. |
| 2006/0157243 A1 | 7/2006 | Nguyen |
| 2007/0007010 A1 | 1/2007 | Welton et al. |
| 2013/0020021 A1 | 1/2013 | Masuda et al. |
| 2013/0048282 A1 | 8/2013 | Adams et al. |
| 2015/0360188 A1 | 12/2015 | Green et al. |
| 2015/0361318 A1 | 12/2015 | Everett et al. |
| 2018/0030339 A1 | 2/2018 | Zha et al. |
| 2018/0086972 A1 | 3/2018 | Chopade et al. |

FOREIGN PATENT DOCUMENTS

| | | | |
|---|---|---|---|
| EP | 965627 | 12/1999 | |
| GB | 789108 A * | 1/1958 | .............. C08L 63/00 |
| GB | 957409 A * | 5/1964 | ........... C07C 233/00 |
| JP | 2006316388 A * | 11/2006 | |
| WO | WO96/41837 | 12/1996 | |
| WO | WO2015/071751 | 5/2015 | |

* cited by examiner

CHEMICAL PRODUCTS FOR ADHESIVE APPLICATIONS

RELATED APPLICATION DATA

This application is a continuation in part of pending U.S. application Ser. No. 15/629,130, filed on Jun. 21, 2017, which application claims benefit to U.S. Provisional Application No. 62/353,444, filed Jun. 22, 2016, of which the entire contents of both applications are incorporated by reference herein.

FIELD OF THE INVENTION

The present invention relates to compositions and products in various applications requiring tackiness. The present invention particularly relates to compositions and products for reducing or mitigating the production of dust from the handling of substrates, and also for fines control, flow-back control, and conductivity enhancements in hydraulic fracturing operations.

BACKGROUND

During hydraulic fracturing when sand is pumped into the formation, a significant amount of fines that are generated at different stages of sand processing and handling are also pumped into the formation with the sand. These fines will migrate to restrict the conductive path that is formed by the sand, and reduce the conductivity of the path.

Proppant flowback is another common problem in fracture stimulated wells. Proppant flowback results in increased well maintenance costs and decreased well production for the productive life of the well. The most common way to reduce proppant flowback is to use curable resin coated proppant (RCP), which has been used for over 30 years. However, RCPs have higher cost compared to uncoated proppant, there can be erosion of resin coating during loading/off loading of the RCPs, and customers often end of paying for unused RCP on location.

Another way to reduce proppant flowback is to make the proppant surface sticky. Tacky chemicals are added to the dry proppant in the frac blender and screw sand hopper at an adjustable concentration to reduce proppant flowback. The tacky chemicals cost less than traditional RCP, eliminate RCP coating erosion, and allow customers to pay for only the proppant coated and pumped downhole. This technology can also be applied in remote locations and use locally sourced substrates where RCP is not readily available. However, current tacky chemicals for proppants have high tackiness at room temperature, which can result in clogging equipment and wellbores during operation.

Additionally, dust generation is problematic in sand mining, storage, transportation and pumping on the frac sites. Dust control is a very challenging problem, and the U.S. Department of Labor's Occupational Safety and Health Administration (OSHA) provides regulations for limiting the occupational exposure to dust particles such as crystalline silica.

Currently, dust control, depending on operation, mainly involves wetting with water, using binders such as lignin sulfonate and processed lignin products, bitumens, tars, and resinous adhesives. All the coatings used in the frac sand in the prior art involve polymeric resins. However, coating the surface of sand with polymers normally involves complex compositions (polymers are normally prepared in emulsion) and procedures. Another drawback with polymer coatings is that these polymers normally have high glass transition temperature, which makes the coating layer brittle, and easily susceptible to mechanical degradation which can generate a secondary dust that is potentially explosive.

Additionally dust control problems affect other industries having particulate issues including mining, such as coal or sand, sand processing, construction, road building, agricultural processes, and general environmental issues.

It would be desirable if compositions and methods could be devised that would adhere the fines to the sand, and prevent fines migration and aggregation, thus, preserve the conductivity of the channels, or to have a resin that can be delivered in a solvent or emulsion, with the coating layer remaining inherently flexible as compared to the prior art.

SUMMARY

The embodiments described herein generally relate to methods and chemical compositions for coating substrate with an adhesive composition. In one embodiment, a composition is provided comprising a reaction product of a polyacid selected from the group consisting of an aromatic polyacid, an aliphatic polyacid, an aliphatic polyacid with an aromatic group, and combinations thereof, or a diglycidyl ether; and a polyamine; and one or more compounds selected from the group consisting of a branched aliphatic acid, a cyclic aliphatic acid with a cyclic aliphatic group, a linear aliphatic acid, and combinations thereof.

In one embodiment, an adhesive composition is provided comprising a reaction product of a polyacid selected from the group consisting of an aromatic polyacid, an aliphatic polyacid, an aliphatic polyacid with an aromatic group, and combinations thereof, or a diglycidyl ether; and a C2-C18 polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In another embodiment, a particulate material is provided, including a substrate and an adhesive composition including a reaction product of a polyacid selected from the group consisting of an aromatic polyacid, an aliphatic polyacid, an aliphatic polyacid with an aromatic group, and combinations thereof, or a diglycidyl ether; and a polyamine; and one or more compounds selected from the group consisting of a branched aliphatic acid, a cyclic aliphatic acid with a cyclic aliphatic group, a linear aliphatic, and combinations thereof. In another embodiment, a gravel pack is provided including the particle material.

In another embodiment, a process for forming a proppant is provided, including providing a substrate, and disposing an adhesive composition thereon.

In another embodiment, a fracturing fluid composition is provided including a fracturing fluid and an additive composition comprising a reaction product of a diglycidyl ether or a polyacid selected from the group consisting of an aromatic polyacid, an aliphatic polyacid, an aliphatic polyacid with an aromatic group, and combinations thereof; and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In another embodiment, a method for treating a subterranean formation is provided including injecting a fracturing fluid composition into the subterranean formation, wherein the fracturing fluid composition including a fracturing fluid and an additive composition comprising a reaction product of a diglycidyl ether or a polyacid selected from the group consisting of an aromatic polyacid, an aliphatic polyacid, an aliphatic polyacid with an aromatic group, and combinations thereof; and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION

Figure 1:
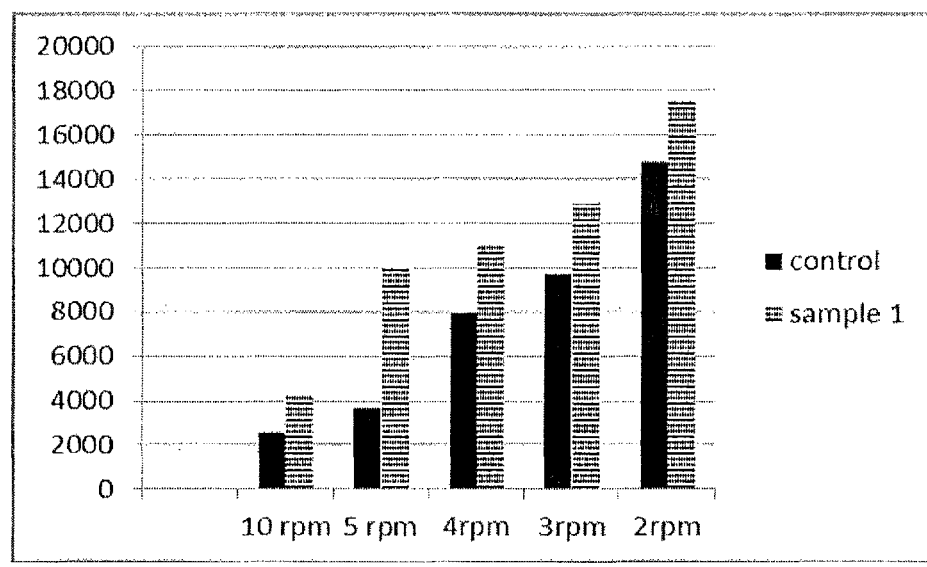
FIG. 1 is a graph showing the comparison of viscosity of sand slurry coated with Sample 1 of this invention versus uncoated sand as a control.

Embodiments of the invention are compositions for coating substrates. In one embodiment, a particulate material is formed by coating a substrate material with an adhesive composition. In one embodiment, a composition is generally considered adhesive when the composition before or after application exhibits adhesive strength above 1 N/m$^2$ or work of adhesion above 1 J/m$^2$.

The substrate material may be any organic or inorganic particulate material.

Suitable inorganic particulate materials include inorganic materials (or substrates), such as exfoliated clays (for example, expanded vermiculite), exfoliated graphite, blown glass or silica, hollow glass spheres, foamed glass spheres, cenospheres, foamed slag, sand, naturally occurring mineral fibers, such as zircon and mullite, ceramics, sintered ceramics, such as sintered bauxite or sintered alumina, other non-ceramic refractories such as milled or glass beads, and combinations thereof. Exemplary inorganic substrate materials may be derived from silica sand, milled glass beads, sintered bauxite, sintered alumina, mineral fibers such as zircon and mullite, or a combination comprising one of the inorganic substrate materials.

Suitable organic particulate materials include organic polymer materials, naturally occurring organic substrates, and combinations thereof. The organic polymer materials may comprise any of the polymeric materials described herein that are carbon-based polymeric materials. Another particulate material is dust, which can be organic or inorganic depending on the source material from which it is derived.

Naturally occurring organic substrates are ground or crushed nut shells, ground or crushed seed shells, ground or crushed fruit pits, processed wood, ground or crushed animal bones, or a combination comprising at least one of the naturally occurring organic substrates. Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or a combination comprising one of the foregoing processed wood materials such as, for example, those derived from woods such as oak, hickory, walnut, poplar, mahogany, including such woods that have been processed by grinding, chipping, or other form of particularization. An exemplary naturally occurring substrate is a ground olive pit.

The substrate may also be a composite particle, such as at least one organic component and at least one inorganic component, two or more inorganic components, and two or more organic components. For example, the composite may comprise an organic component of the organic polymeric material described herein having inorganic or organic filler materials disposed therein. In a further example, the composite may comprise an inorganic component of any of the inorganic polymeric material described herein having inorganic or organic filler materials disposed therein.

Inorganic or organic filler materials include various kinds of commercially available minerals, fibers, or combinations thereof. The minerals include at least one member of the group consisting of silica (quartz sand), alumina, mica, meta-silicate, calcium silicate, calcine, kaoline, talc, zirconia, boron, glass, and combinations thereof. Fibers include at least one member selected from the group consisting of milled glass fibers, milled ceramic fibers, milled carbon fibers, synthetic fibers, and combinations thereof.

The substrate material may have any desired shape such as spherical, egg shaped, cubical, polygonal, or cylindrical, among others. It is generally desirable for the substrate material to be spherical in shape. Substrate materials may be porous or non-porous. Preferred substrate particles are hard and resist deforming. Alternatively, the substrate material may be deformable, such as a polymeric material. Deforming is different from crushing wherein the particle deteriorates usually creating fines that can damage fracture conductivity. In one embodiment, the inorganic substrate material does not melt at a temperature below 450° F. or 550° F.

For proppant formation, the substrate may be in the form of individual particles that may have a particle size in the range of ASTM sieve sizes (USA Standard Testing screen numbers) from about 6 to 200 mesh (screen openings of about 3360 μm or about 0.132 inches to about 74 μm or 0.0029 inches). Typically for proppant or gravel pack individual particles of the particulate substrate have a particle size in the range of USA Standard Testing screen numbers from about 8 to about 100 mesh (screen openings of about 2380 μm or about 0.0937 inches to about 150 μm or about 0.0059 inches), such as from 20 to 80 mesh (screen openings of about 841 µm or about 0.0311 inches to about 177 µm or 0.007 inches), for example, 40 to 70 mesh, (screen openings of about 400 µm or about 0.0165 inches to about 210 µm or 0.0083 inches) may be used to define the particle size.

The polyamine may be any amine having two or more amine groups. Suitable polyamines include diamines. Suitable diamines include polyethylenepolyamines, C2-C12 linear diamines, cyclic diamines, diamine with aromatic content, polyetherdiamines, polyoxyalkylene diamines, and combinations thereof. Examples of polyamines include polyamines selected from the group consisting of ethylenediamine, diethylenetriamine, triethylenetetraamine, bis(aminomethyl)cyclohexane, phenylenediamine, naphthalene diamine, xylene diamine, polypropylene oxide diamine, and combinations thereof. Other suitable amines include higher amines from reactions of diamines such as xylenediamine with epichlorohydrin such as Gaskamine 328 (Mitsubishi Gas Chemical Co). Other polyamines include triamines and tetramines, for example, polyethertriamine (Jeffamine T-403 available from Huntsman of Houston Tex.) and triethylenetetramine (TETA), and combinations thereof.

In one embodiment of the polyamines, a polyamine is selected from the group consisting of polyethylenepolyamines, C2-C12 diamines, polyetherdiamines, and combinations thereof. Examples of these polyamine include polyamines selected from the group consisting of ethylenediamine, diethylenetriamne, triethylenetetraamine, and combinations thereof.

The polyamine may be any amine having two or more amine groups. Suitable polyamines include diamines. Suitable diamines include polyethylenepolyamines, C2-C12 linear diamines, cyclic diamines, diamine with aromatic content, polyetherdiamines, polyoxyalkylene diamines, and combinations thereof. Examples of polyamines include polyamines selected from the group consisting of ethylenediamine, diethylenetriamine, triethylenetetraamine, bis(aminomethyl)cyclohexane, phenylenediamine, naphthalene diamine, xylene diamine, polypropylene oxide diamine, and combinations thereof. Other suitable amines include higher amines from reactions of diamines such as xylenediamine with epichlorohydrin such as Gaskamine 328 (Mitsubishi Gas Chemical Co). Other polyamines include triamines and tetramines, for example, polyethertriamine (Jeffamine T-403 available from Huntsman of Houston Tex.) and triethylenetetramine (TETA), and combinations thereof.

In one embodiment of the polyamines, a polyamine is selected from the group consisting of polyethylenepolyamines, C2-C12 diamines, polyetherdiamines, and combinations thereof. Examples of these polyamine include polyamines selected from the group consisting of ethylenediamine, triethylenetetraamine, and combinations thereof.

The reaction product includes from about 10 wt. % to about 60 wt. %, such as from about 15 wt. % to about 45 wt. %, of the polyamine; and from about 40 wt. % to about 90 wt. %, such as from about 55 wt. % to about 85 wt. % of the polyacid based on the weight of the reaction product. The polyamine and the polyacid may also be provided to form the reaction mixture at a molar ratio of polyamine to polyacid of about 2:1 to about 1:2.

The polyacid may be selected from the group consisting of an aromatic polyacid, an aliphatic polyacid, an aliphatic polyacid with an aromatic group, and combinations thereof.

The polyacid may comprise a diacid. Suitable diacids include diacids selected from the group consisting of aromatic diacid, aliphatic diacid, aliphatic diacid with an aromatic group, and combinations thereof. The diacids may be saturated diacids or unsaturated diacids. The diacids may also be C2-C24 diacids and/or dimerized fatty acids. Suitable examples of diacids include terephthalic acid, phthalic acid, isophthalic acid, oxalic acid, malonic acid, succinic acid, glutaric acid, adipic acid, pimelic acid, suberic acid, azelaic acid, maleic acid, fumaric acid, muconic acid, and combinations thereof.

The aliphatic diacid with aromatic group(s) block(s) between the acid groups may be represented by following general formulas:

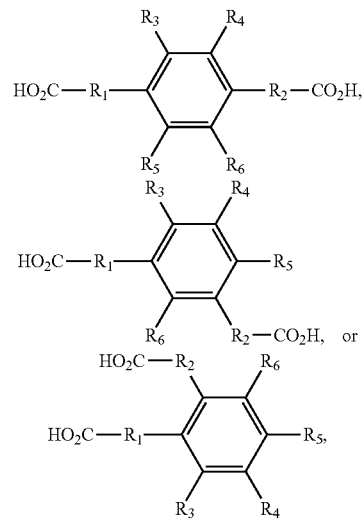

and combinations thereof, wherein each of R1 and R2 are independent functional groups selected from the group consisting of C1-C12 alkyl, alkyloxy, alkylamino, and alkylcarboxy, and each of R3, R4, R5, and R6 are independent functional groups selected from the group consisting of hydroxyl (—OH), amino, nitro, sulfonyl, C1-C12 alkyl, alkyloxy, alkylamino, and alkylcarboxy.

The aromatic diacids may also be substituted with a functional group selected from the group consisting of amine, hydroxyl (—OH), C1-C12 alkyl, alkylamino, alkyloxy alkenyloxy, alkylcarboxy, alkylnitro, alkylsulfonyl and wherein the substitution on the aromatic ring is in one or more positions. For example, the terephthalic acid, the phthalic acid, and the isophthalic acid, may be substituted with a functional group selected from the group consisting of amine, hydroxyl (—OH), C1-C12 alkyl, alkylamino, alkyloxy, alkenyloxy, alkylcarboxy, alkylnitro, alkylsulfonyl, and wherein the substitution on the aromatic ring is in one or more positions.

In one embodiment, the adhesive composition includes a reaction product of a triacid and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the triacid and the polyamine forms an adduct.

Suitable triacid include citric acid, isocitric acid, aconitic acid, propane-1,2,3-tricarboxylic acid, trimesic acid, and the combinations thereof.

In one embodiment, the adhesive composition includes a reaction product of a tetraacid and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the tetraacid and the polyamine forms an adduct.

Suitable tetraacids include ethylenediaminetetraacetic acid (EDTA), furantetracarboxylic acid, methanetetracarboxylic acid, ethylenetetracarboxylic acid, benzenetetracarboxylic acid, and benzoquinonetetracarboxylic acid, and the combinations thereof.

In another embodiment, the adhesive composition includes a reaction product of a polyamine and a diglycidyl ether; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the diglycidyl ether and the polyamine forms an adduct.

The reaction product includes from about 10 wt. % to about 60 wt. %, such as from about 15 wt. % to about 45 wt. %, of the polyamine, and from about 40 wt. % to about 90 wt. %, such as from about 55 wt. % to about 85 wt. %, of the diglycidyl ether based on the weight of the reaction product. The polyamine and the diglycidyl ether may also be provided to form the reaction mixture at a molar ratio of polyamine to diglycidyl ether of about 2:1 to about 1:2.

Examples of suitable diglycidyl ether selected from the group consisting of diglycidyl ether of bisphenol A, diglycidyl ether of bisphenol F, diglycidyl ether of bisphenol B, diglycidyl ether of bisphenol C, diglycidyl ether of bisphenol E, diglycidyl ether of bisphenol AP, diglycidyl ether of bisphenol AF, diglycidyl ether of bisphenol BP, diglycidyl ether of bisphenol G, diglycidyl ether of bisphenol M, diglycidyl ether of bisphenol S, diglycidyl ether of bisphenol P, diglycidyl ether of bisphenol PH, diglycidyl ether of bisphenol TMC, diglycidyl ether of bisphenol Z, and combinations thereof.

In another embodiment, the adhesive composition includes a reaction product of a polyamine and a diacid, a diglycidyl ether, or a combination thereof; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the a polyamine and a diacid, a diglycidyl ether forms an adduct.

The reaction product, includes from about 10 wt. % to about 80 wt. %, such as from about 18 wt. % to about 50 wt. %, of the polyamine, and from about 20 wt. % to about 90 wt. %, such as from about 50 wt. % to about 82 wt. %, of the diacid, the diglycidyl ether, or a combination thereof based on the weight of the reaction product. The polyamine and the diacid, diglycidyl ether may also be provided to form the reaction mixture at a molar ratio of polyamine to the diacid, the diglycidyl ether, or a combination thereof of about 2:1 to about 1:2.

The composition may comprise from about 25 wt. % to about 96 wt. %, such as from about 45 wt. % to about 80 wt. %, of the reaction product and may comprise from about 4 wt. % to about 75 wt. %, such as from about 20 wt % to about 55 wt. % of the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

The polyamine and the diglycidyl ether may also be provided to form the reaction mixture at a molar ratio of polyamine to the diacid, the diglycidyl ether, or a combination thereof of about 2:1 to about 1:2, with the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof being added to the composition at a molar ratio of polyamine to the diacid, the diglycidyl ether, or a combination thereof to the one or more compounds of about 2:2:1 to about 2:6:5. For example, an aliphatic acid amine-diacid-amine-aliphatic acid structure, has a molar ratio of 2:2:1 ratio, and an aliphatic acid (amine-diacid)$_5$-amine-aliphatic acid has a structure with a molar ratio of 2:6:5 ratio.

The branched aliphatic acid having a C2-C26 alkyl group may be selected from the group consisting of neopentanoic acid, neononanoic acid, neodecanoic acid, neotridecanoic acid, and combinations thereof. Examples of such acids include Hexion's Versatic Acid™ 5, 9, 10, 913, and 1019 acids. The branched aliphatic acid having a C2-C26 alkyl group may comprise from about 9 wt. % to about 65 wt. %, such as from about 25 wt. % to about 50 wt. %, of the composition.

The cyclic aliphatic acid with C7-C30 cyclic aliphatic group may be selected from the group consisting of rosin, naphthenic acid, and combinations thereof. Examples of rosins include rosin acid, tall oil rosin, or gum rosin. All rosins are provided the CAS number 8050-09-7. The cyclic aliphatic acid with C7-C30 cyclic aliphatic group may comprise from about 20 wt. % to about 87 wt. %, such as from about 25 wt. % to about 65 wt. %, of the composition.

The linear aliphatic acid having C2-C26 alkyl group may be selected from the group consisting of unsaturated C2-C26 fatty acids, saturated C2-C26 fatty acids, and combinations thereof. Examples of unsaturated fatty acids include tall oil fatty acid, myristoleic acid, palmitoleic acid, sapienic acid, oleic acid, elaidic acid, vaccenic acid, linoleic acid, linoelaidic acid, alpha-linolenic acid, arachidonic acid, eicosapentaenoic acid, erucic acid, docosahexaenoic acid, and combinations thereof. Examples of saturated fatty acids include caprylic acid, capric acid, lauric acid, myristic acid, palmitic acid, stearic acid, arachidic acid, behenic acid, lignoceric acid, cerotic acid, and combinations thereof. The linear aliphatic acid having C2-C26 alkyl group may be any plant and animal fatty acid that are the combinations of above unsaturated and saturated fatty acids such as tall oil fatty acid, rosin acid, and fatty acids made from chicken fat, lard, beef tallow, canola oil, flaxseed oil, sunflower oil, corn oil, olive oil, sesame oil, peanut oil, cottonseed oil, palm oil, butter, and cocoa butter, palm kernel oil, coconut oil, and the alike. One example is tall oil fatty acids, and another example is rosin acid The linear aliphatic acid having C2-C26 alkyl group may comprise from about 20 wt. % to about 87 wt. %, such as from about 25 wt. % to about 65 wt. %, of the composition.

In one embodiment of the invention, the adhesive composition is made with the diacid comprising terephthalic acid, the polyamine comprising diethylenetriamine, and the linear aliphatic acid having C2-C26 alkyl group comprising tall oil fatty acid (TOFA). Such a composition is suitable for use as a dust control composition, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition is suitable for use as a proppant flow-back control composition in fracturing process, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition, when combined with a cross-link agent, is suitable for use as a proppant flow-back control and consolidating agent for proppant pack and gravel pack in fracturing process, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition, when combined with a cross-link agent, is suitable for use as agents for consolidating downhole formation of the well in fracturing process, among other uses.

In another embodiment, a cross-linking agent may be added to the composition. The cross-link agents may include epoxy compounds. Examples of suitable cross-link agents include a diglycidyl ether selected from the group consisting of diglycidyl ether of bisphenol A, diglycidyl ether of bisphenol F, diglycidyl ether of bisphenol B, diglycidyl ether of bisphenol C, diglycidyl ether of bisphenol E, diglycidyl ether of bisphenol AP, diglycidyl ether of bisphenol AF, diglycidyl ether of bisphenol BP, diglycidyl ether of bisphenol G, diglycidyl ether of bisphenol M, diglycidyl ether of bisphenol S, diglycidyl ether of bisphenol P, diglycidyl ether of bisphenol PH, diglycidyl ether of bisphenol TMC, diglycidyl ether of bisphenol Z, and combinations thereof. For example, diglycidyl bisphenol ether may be used as a cross-link agent for R-diamine-diacid-diamine-R type adhesives. In another example, the diglycidyl bisphenol ether also can be used to form R-diamine-diglycidyl bisphenol ether-diamine-R type adhesive.

In one embodiment, the adhesive composition comprises a formula selected from the group of:

$$R_1-dAm-(dAc-dAm)_n-R_2, \quad \text{(Structure 1)}$$

$$R_1-dAm-(dGE-dAm)_n-R_2, \quad \text{(Structure 2)}$$

or a mixture thereof, wherein n is 0 to 10, R1 and R2 are each independently selected from the group of a branched aliphatic acid having C2-C26 alkyl group, cyclic aliphatic acid with C7-C30 cyclic aliphatic group, a linear aliphatic acid having C2-C26 alkyl group, or a combination thereof, the dAm comprises a polyamine, such a diamine described herein, dAc comprises a diacid as described herein, and dGe comprises a diglycidyl ether as described herein.

In another embodiment, the diacid comprises terephthalic acid, the polyamine comprises diethylenetriamine, and the reaction product comprises:

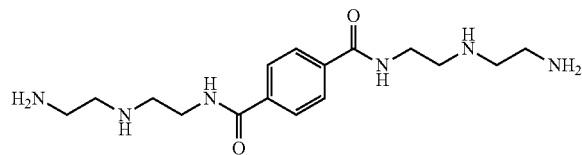

(Structure 3)

The reaction product is then reacted with (a branched aliphatic acid having C2-C26 alkyl group) versatic acid, (the cyclic aliphatic acid with C7-C30 cyclic aliphatic group) rosin (Rosin), (the linear aliphatic acid having. C2-C26 alkyl group) tall oil fatty acid (TOFA), or a combination thereof and the composition comprises:

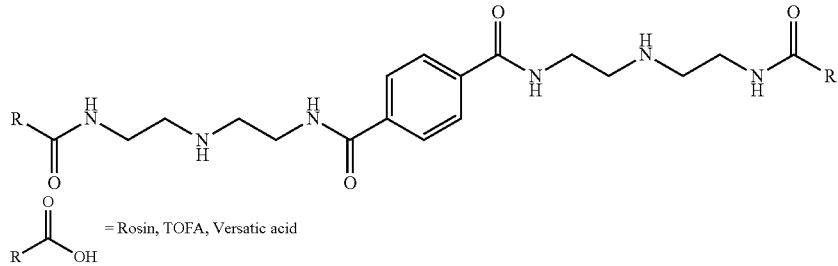

(Structure 4)

In another embodiment, the adhesive composition includes a reaction product from concurrently reacting components a)-c) which are a) a polyamine, b) a diacid, a diglycidyl ether, or a combination thereof, and c) one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of a), b), and c) forms composition.

In another embodiment, the adhesive composition comprises a formula selected from the group of:

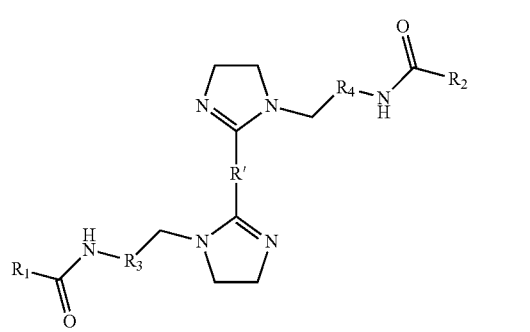

(Structure 5)

Wherein R' is the central organic segment of a diacid (HO$_2$C—R'—CO$_2$H) as described herein. $R_1$ and $R_2$ are each independently selected from the group of a branched aliphatic acid having C2-C26 alkyl group, cyclic aliphatic acid with C7-C30 cyclic aliphatic group, a linear aliphatic acid having C2-C26 alkyl group, or a combination thereof. $R_3$ and $R_4$ are alkyl, or alkylamino groups such as —$(CH_2—)_n$—, or —$(CH_2CH_2NH)_n$—, or combination thereof and n is from 0 to 10. Structure 5 is a bis-imidazoline component. Structure 5 is derived from a diacid ($HO_2C$—R'—$CO_2H$) as described herein with R' being the organic segment to which the carboxylic acid groups are attached.

The composition described herein for Structures 1, 2, 4, and 5 can further be modified by grafting the backbone through oxyalkylation of the secondary amine, or reacting the secondary amine with ethylene oxide, propylene oxide or butylene oxide in any ratio, or sequences, or molar mass.

The composition described herein for Structures 1, 2, 4, and 5 can further be modified by reacting the secondary amine with epoxides. Suitable epoxides include an alkylglycidyl ether, such as butylglycidyl ether, p-tert-butyl phenyl glycidyl ether, cresyl glycidyl ether, Castor oil glycidyl ether, glycidyl ester of neodecanoic acid, and combinations thereof.

The composition described herein for Structures 1, 2, 4, and 5 can further be modified by grafting the main chain through amidation of the secondary amine, or through the esterification of the hydroxyl with carboxylic acids if there are hydroxyl groups available for reaction. Suitable carboxylic acids include any carboxylic acids described herein including, for example, tall oil fatty acid, tallow fatty acid, neoalkanoic acid (such as Hexion's Versatic™ acid described herein), and combinations thereof.

The composition described herein for Structures 1, 2, 4, and 5 can further be modified by quaterizing the secondary amine. Suitable compounds for quaterizing the secondary amine include, but not limited to, benzyl chloride, acrylic acid, and combinations thereof.

The composition described herein for Structures 1, 2, 4, and 5 can further be reacted by oxidizing the secondary amine to an amine oxide.

The adhesive composition may further comprise a solvent. Suitable solvents include a solvent selected from the group consisting of aromatic solvents, ethers, alcohols, water, and combinations thereof. Examples of aromatic solvents include toluene, xylenes, naphthas, and combinations thereof. Examples of suitable naphtha solvents are heavy aromatic naphtha solvents such as Aromatic 100, Aromatic 150, and Aromatic 200, commercially available from ExxonMobil Inc. Examples of ethers include diglyme, triglyme, polyglyme, proglyme (BASF), ethylene glycol butyl ether (EGBE), tripropyleneglycol methyl ether, ethyleneglycol butyl ether, dipropylene glycol ethyl ether, tripropylene glycol ethyl ether, diethylene glycol ethyl ether, diethyleneglycol butyl ether, and combinations thereof. Examples of alcohols include methanol, isopropanol, ethanol, propanol, butanol, ethoxytriglycol, methoxytriglycol, 2,2-dimethyl-4-hydroxymethyl-1,3-dioxolane (Solvay SL 191), and combinations thereof.

The solvent system or solvent mixture is designed to allow transport and delivery of the coating material at the individual interfaces between the individual sand grains. These solvent combinations are also designed to allow good solubility and good wetting of the sand surface. The solvent system is designed to have a water soluble component or components that assist transport and delivery of the coating material in the slurry, but diffuse into the aqueous matrix after coating to allow a viscous, adhesive coating on the sand surface. The subsequent diffusion of the oil soluble component or components from the coating layer into the oil matrix ensures a rigid adhesive bond between the sand grains and consequently the formation of a solid core.

The adhesive compositions herein may function as a pressure sensitive adhesive when the composition is in a (high viscosity) liquid state or semi-liquid state. In one embodiment, the composition may further include solvents, plasticizers, wetting agents, polymers, and combinations thereof.

The adhesive composition described herein may be used for coating a proppant, used for adhesive applications, such as a tackifier for hot-melt adhesive applications, or pressure sensitive adhesive, used for paints and other large surface coatings. Additionally, the adhesive coating may are used for dust suppression, such as in agricultural, coal, stone (gravel dust), cement, concrete, and road applications, among others. In fracturing processes, the adhesive composition may be used for proppant flow-back control, the consolidation of proppant packs, and consolidation of formations, among other uses.

A process for forming an adhesive composition includes reacting a diacid and a polyamine to form a reaction mixture, and then adding one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof, to form the adhesive composition.

In one embodiment of the process, the adhesive composition may be created as follows. A diacid and a polyamine are added together in a reactor at a first temperature and then heated to a second temperature. The reaction was continued at the second temperature for a first period of time until no water was further releases and the reaction product was formed. Optionally, a nitrogen purge may be performed during the first period of time. Then the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof, to form the adhesive composition, were added to the reactor and the reaction was continued at the second temperature for a second period of time. The one or more compounds may be added dropwise. Optionally, a nitrogen purge may be performed during the second period of time. The reaction temperature was increased to a third temperature for a third period of time. After the third period of time, the composition was cool to a fourth temperature, and transferred to a receptacle, which was maintained at a fifth temperature.

The first temperature was from about 100° C. to about 185° C., for example, from about 145° C. to about 180° C. The second temperature was from about 180° C. to about 220° C., for example, from about 190° C. to about 215° C. The first period of time was from about 30 minutes to about 5 hours, for example about 1.5 hours. The second period of time was from about 30 minutes to about 5 hours, for example about 1 hour. The third temperature was from about 210° C. to about 260° C., for example, about 250° C. The third period of time was from about 20 minutes to about 3 hours, for example about 30 minutes. The fourth temperature was from about 260° C. to about 140° C., for example, about 150° C. The fourth temperature was from about 150° C. to about 110° C., for example, about 120° C.

In one embodiment, the particle material may be a proppant material formed by coating a substrate material as described herein with the adhesive composition described herein.

Proppant materials, or proppants, are generally used to increase production of oil and/or gas by providing a conductive channel in the formation. Fracturing of the subterranean formation is conducted to increase oil and/or gas production. Fracturing is caused by injecting a viscous fracturing fluid or a foam at a high pressure (hereinafter injection pressure) into the well to create a fracture. A similar effect can be achieved by pumping a thin fluid (water containing a low concentration of polymer) at a high injection rate.

As the fracture is formed, a particulate material, referred to as a "proppant" is placed in the formation to maintain the fracture in a propped condition when the injection pressure is released. As the fracture forms, the proppants are carried into the fracture by suspending them in additional fluid or foam to fill the fracture with a slurry of proppant in the fluid or foam, often referred to as a fracturing fluid or fracking fluid. Upon release of the pressure, the proppants form a pack that serves to hold open the fractures. The propped fracture thus provides a highly conductive channel in the formation. The degree of stimulation afforded by the hydraulic fracture treatment is largely dependent upon formation parameters, the fracture's permeability, the propped fracture length, propped fracture height and the fracture's propped width.

Gravel packing treatments are used to reduce the migration of unconsolidated formation sands/fines into the well bore. In gravel packing operations, the proppant materials described herein are suspended in a carrier fluid and are pumped into a well bore in which the gravel pack is to be placed. The carrier fluid leaks off into the subterranean, zone and/or is returned to the surface while the proppant materials are left in the annulus between the production string and the casing or outside the casing in the subterranean zone adjacent to the wellbore.

Gravel pack operations generally involve placing a gravel pack screen in the well bore and packing the surrounding annulus between the screen and the well bore with the particles. The gravel pack screen is generally a type of filter assembly used to support and retain the proppant materials placed during the gravel pack operation. A wide range of sizes and screen configurations are available to suit the characteristics of a particular well bore, the production fluid, and the subterranean formation sands. Such gravel packs may be used to stabilize the formation while causing minimal impairment to well productivity. The gravel pack acts as a filter to separate formation sands from produced fluids while permitting the produced oil and/or gas to flow into the well bore. The proppant materials act to prevent formation sands from plugging the screen or migrating with the produced fluids, and the screen acts to prevent fines from being produced to the surface and out of the well.

In some situations, the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

In one embodiment, the particle material may be a proppant formed by coating a substrate material as described herein with the adhesive composition described herein. The deposited coating may be continuous or non-continuous. If continuous, the coating may be deposited at a thickness from about 0.001 microns to about 10 microns. The proppant material may be pre-cured or curable.

In one embodiment of the proppant material, the coating of the adhesive composition may comprise from about 0.05% to about 10% by weight, such as from about 0.5% to about 4% by weight, for example, from about 0.8% to about 2% by weight, of the proppant material; and the substrate material comprises from about 90% to about 99.95% by weight, such as from about 95% to about 99.9% by weight, for example, from about 98% to about 99.8% by weight, of the proppant material.

The process to form the proppant material may be a batch process, a semi-continuous process, or a continuous process. The process to form the proppant material may be performed remotely at a manufacturing facility or may be manufactured at point of use, such as using a device described in United States Patent Publication US2015/0360188, which is incorporated herein by reference in its entirety not inconsistent with the description herein.

In one embodiment of the proppant formation process, a substrate material, such as sand, introduced into a mixing device. The substrate material may be heated before or after addition to a mixing device. The substrate material is heated to a temperature from about 20° C. to about 50° C., for example, about 21° C. Next the adhesive composition, and any additives, such as a coupling agent or cross-linking agent, are added while mixing. After coating for a period of time, such as from about 1 minute to about 1 hour, for example about 4.25 minutes, the batch is cooled through the addition of water and mixing continued to obtain free-flowing particles of coated proppant. The coated particles (proppant material) are discharged from the mixer and passed through a screen and the desired particle sizes of proppant are recovered. The particles are agitated during curing.

In another embodiment of the proppant formation process, the proppant may be a formed by a real-time coating or point-of-use manufacturing process, such as at a well site. In such a process, a substrate material, such as sand, is introduced into a mixing device. Next the adhesive composition, and any additives, such as a coupling agent or cross-linking agent, are added while mixing. After a coating period of time, such as from about 1 minutes to about 1 hours, for example about 4.25 minutes, the coated substrate will be directly delivered to the fracturing fluid, and pumped together to the down-hole formation.

The mixing can take place in a device that uses shear force, extensional force, compressive force, ultrasonic energy, electromagnetic energy, thermal energy or a combination comprising at least one of the foregoing forces and energies. The mixing is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are EIRICH™ mixer, WARING™ blenders, HENSCHEL™ mixers, BARBER GREEN™ batch mixers, ribbon blenders, or the like.

In an embodiment of a proppant production process, substrate material is coated in a continuous system. Substrate material enters an elongated (for example, 20 foot long) horizontal mixer containing two horizontally mounted shafts having paddles to promote mixing the ingredients and moving them horizontally along the mixer. If employed, any additives, such as a coupling agent or cross-linking agent, are immediately added, and then the adhesive composition as described herein is added. This mixture travels down the mixer. The total time in the mixer can range from about 3-10 minutes depending on desired throughput rate.

In one embodiment of a continuous coating system in which substrate material and coating material are fed to the long horizontal oriented mixer that may be of varying length and diameter. The embodiment of the continuous coating system has from two to four horizontal shafts that run the length of the mixer. Along the shaft there are positioned multiple sets of mixing paddles mounted on the shaft. The paddles are oriented so as to insure both mixing and the transport of the substrate from the beginning of the mixer to its exit point. At various points along the mixer are positioned addition ports so chemicals may be added at prescribed rates and times. For example, there may be addition ports for additives and surface wettability modifiers as described herein.

The proppant materials, as described in this invention may be injected into the subterranean formation as the sole proppant in a 100% proppant pack (in the hydraulic fracture) or as a part replacement of existing commercial available ceramic and/or sand-based proppants, polymeric material-coated and/or uncoated, or as blends between those, for example, coated particles, are 5 to 50 weight % proppant materials as described herein of the total proppants injected into the well. For example, the uncoated proppant materials may be first placed in a well, and afterwards a proppant material as described herein may be placed in the fracture that is closest to the wellbore or fracture openings. This type of fracturing treatment is done without stopping to change the proppant and is known in the industry as a "tail-in treatment".

In a further embodiment, proppant materials as described herein in the 70/140 mesh range, sometimes referred to as fluid loss additives, are provided as a part replacement of existing commercial available ceramic and/or sand-based proppants, polymeric material-coated and/or uncoated, or as blends between those, are 3 to 50 weight % proppant materials as described herein of the total proppants. Such 70/140 mesh proppant materials described herein would be placed first, typically as part of a pad. This portion of the coated proppant is typically pumped in slugs in the pad.

In another embodiment, an additive composition comprising the adhesive composition described herein may be directly added to a fracturing fluid (also referred to as fracking fluid or carrier fluids). Generally, fracturing fluids are well known in the art of examples of materials comprising fracturing fluids include water and optionally, one or more of a gelling agent, a friction reducer, an acid, a surfactant, a crosslinker, a biocide, a scale inhibitor, a non-emulsifier, a breaker, a proppant and combinations thereof. The additive composition described herein may be present in an amount in the range of from about 0.01 weight percent to about 10 weight percent, such as from about 0.1 weight percent to about 3 weight percent, for example from 0.25 weight percent to 1.5 weight percent, based on the total weight of the fracturing fluid.

The fracturing fluid may further include proppants, such as proppants made with the adhesive composition described herein, which comprise from about 1 weight percent to about 50 weight percent, such as from about 5 weight percent to about 40 weight percent, based on the total weight of the fracturing fluid.

In operation, the fracturing fluid composition described herein is introduced into a subterranean formation, such as by pumping or gravity deposition, and which introduction is referred to one skilled in the art as "injecting" (or "pumping") a fracturing fluid composition into a subterranean formation. In one embodiment, the injecting process includes introducing the fracturing fluid composition via pre-positioned perforations in specific locations and spacing along the wellbore.

In an embodiment including a proppant, such as the proppants described herein, the fracturing fluid composition injection process comprises suspending the proppants in a fracturing fluid (often referred to as a carrier fluid) to form a suspension and injecting the suspension into a subterranean formation.

In practice, the suspension is injected into a subterranean formation at high rate and high pressure, which in turn results in creating a network of fractures into the formation. The fractures are prevented from closing by the suspended proppant. The suspended proppant, such as proppants described herein, form a high permeability pathway or conduit to extract hydrocarbon fluid out of the very low permeability shale or rock formation, once the fracturing pressure is relieved and the formation starts to produce.

For dust control, the adhesive composition described herein may be applied to suppress dust on substrates, which may also be referred herein to as dust source substrate. The composition may be disposed on the substrate, and may be applied to be continuously or semi-continuously disposed on the dust source substrate. The composition may be applied on one or more substrates, as described herein above as organic or inorganic particulate material comprising the dust source substrate, such as for coal contained in a coal car. Suitable dust source substrates to which the composition can be applied include coal (and coal dust), mined materials including ores and minerals, surface mining operations, roads and road surfaces including unimproved roads and surfaces (for example "dirt roads"), mining or manufacturing waste dumps, harvested and non-harvested agricultural crops, fields, charcoal, sand mines, sand transloads, proppant transloads, sand storage, proppant storage, earth moving operations, cement mixing, open railcar loads, open truck loads, environmental remediation, quarries, mining waste, wind erosion protection, agriculture product control (crop seeds dust control), and soil stabilization, and combinations thereof, among others. For example, in one embodiment, the compositions may be applied to a substrate of coal as a coal dust suppressant. The composition described herein may also be used as a topical spray on automobiles as a proactive coating for shipment.

The adhesive composition described herein may be applied to a dust producing substrate or substrates, such as coal which produces coal dust. The composition may be applied to the exposed surfaces, such as a top surface, of the substrate, such as coal, by applying the compositions described herein by a spraying technique, a misting technique, a poring technique, mixing technique, blending technique or combinations thereof, to the exposed surfaces of the substrate. The composition or emulsions described herein are applied to provide sufficient dust suppression. The composition described herein may be diluted or emulsified prior to application to a substrate or used with a solvent, and may be combined with water or solvent. In one embodiment, the composition may be applied to provide for dust control at an amount of 0.001 to 10 wt. % of the weight of the substrates.

EXAMPLES

Aspects and advantages of the embodiments described herein are further illustrated by the following examples. The particular materials and amounts thereof, as well as other conditions and details, recited in these examples should not be used to limit the embodiments described herein. All parts and percentages are by weight unless otherwise indicated.

Example 1: Typical Synthesis Procedure of the Adhesives

To a four-neck flask was charged diethylenetriamine (DETA, 51.5 g, 0.5 mol). The flask was heated up to 145° C. Terephthalic acid (TPA, 41.5 g, 0.25 mol) was charged portion wise so no clumping occurs, while allowing the heating continue. The temperature was controlled between 145° C. to 180° C. After the addition was complete, and TPA was completely dissolved, the reaction was heated up to 190-215° C., and held at this temperature for 1.5 h, or until no water was further released. Nitrogen purge was used to drive the reaction to complete. To the flask was added tall oil fatty acid (TOFA) (L-5 from Ingevity, 148 g, 0.5 mol) drop wise, and the reaction continued. The addition took about 1 h. After the addition was complete, the reaction was held at 190° C. to 215° C. for 1 h. Nitrogen purge was used to drive the generated water out. The reaction was then heated up to 250° C., and held for 30 min. The reaction was then cooled down to 150° C., and the liquid brown product was transferred to a glass jar.

Example 2: Flow-Back Control Coating-Stickiness Evaluation

A new test method was developed to evaluate the degree of adhesion (tackiness) that the chemicals of this invention introduce to the surface of the individual sand grains when they are coated with the chemicals. The equipment of this new method was designed and constructed that the viscosity of the slurry can be measured at various temperatures between 0° C. and 95° C., using a circulated water bath with accurate temperature control. The coating procedure is as the following.

Sample 1, made by the process of Example 1 except using rosin in place of the tall oil fatty acid to form the final product, was dissolved in a solvent comprising of 25% heavy aromatic naphtha and 75% dipropyleneglycol ether to generate a viscous liquid with 50% active ingredient. 1 g of the liquid sample was added to 100 g of sand in a 200 ml glass jar, and the resulting mixture was mixed with spatula manually for 5 min, or until the chemical was evenly coated on the sand surface. Next, 100 ml of tap water was added to the jar, and the resulting slurry was stirred with a spatula manually for 20 seconds, and the water was decanted. The last step was repeated once. Then, 60 ml of tap water were added to the jar.

The increase in viscosity of the slurry, as result of the chemical addition is used as an indication of the degree of adhesion (stickiness) between the sand grains. The viscosity of the slurry was measured with a Brookfield viscometer, equipped with T-bar spindles, which was immersed in the slurry during the measurement.

From FIG. 1 (FIG. 1), sand coated with the adhesive of this invention has significantly higher viscosity at all rotational rates, especially at the 5 and 10 RPM.

Figure 2:
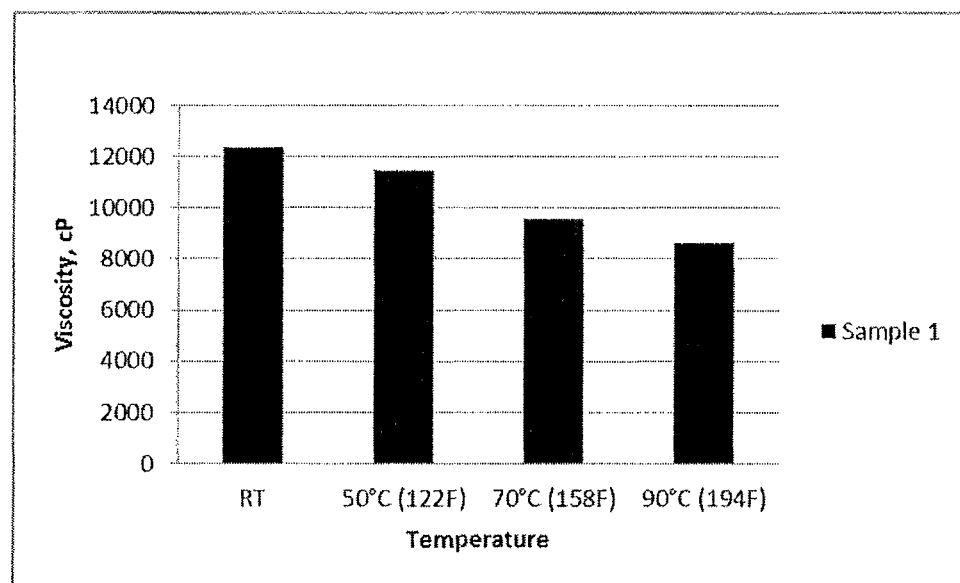
FIG. 2 is a graph showing the viscosity of sand slurry coated with Sample 1 of this invention at different temperature control.

A major challenge in fracturing operation that uses the real-time coating method is that the high stickiness of the coating layer causes clogging of equipment and wellbore. In order to reduce the clogging, an ideal coating layer should have low stickiness at ambient temperature when coated sand is pumped to down-hole formation, while having or maintaining good stickiness after depositing in the down-hole fractures which normally has high temperature and high pressure (HPHT or HTHP). From FIG. 2 (FIG. 2), Sample 1 provides a good temperature profile appreciable to one of ordinary skilled in the art. At ambient temperature when the coated sand is pumped, Sample 1 has a relatively low viscosity, and at high temperature that corresponds to the down-hole condition, the viscosity remains stable to one of ordinary skilled in the art.

Example 3. Flow-Back Control Coating—Evaluation of Unconfined Compressive Strength of Non-Cross-Linked Resin Unconfined Compressive Strength—General Loading and Testing Procedure.

The terms "cured" and "curable" may be defined for the present specification by the bond strength of the surface material. In one embodiment described herein, curable is any surface material having a UCS Bond Strength of 1 psi or greater and/or capable of forming a core.

Compressive strength of curable proppants is defined as that measured according to the following procedure, known as the Unconfined Compressive Strength or UCS test. In this test, proppant is added to a 2 weight percent KCl solution doped with a small amount of detergent to enhance wettability. The KCl solution and proppant, such as from about 6 to about 18 lbs., typically about 12 lbs. proppant per gallon KCl, are gently agitated to wet the proppant. Remove entrained air bubbles, if any. If necessary use a wetting agent to remove the bubbles. This slurry from about 100 to about 200 grams depending on density) is transferred into duplicate 1.25 inch outside diameter, 10 inch stainless steel cylinders, equipped with valves on the top and bottom to bleed liquid and gas pressure as required, a pressure gauge reading 0 to 2000 psi, and a floating piston to transfer pressure to the sample. Typically at least 2, preferably at least 3 specimen molds are loaded to give a length greater than two times the diameter of the finished slug. The bottom valve is opened during the application of stress, allowing fluid to drain from the slurry, and then closed during the application of temperature. The cylinder is connected to a nitrogen cylinder and 1000 psi is imposed on the cylinder, transmitted by the sliding pistons to the sample, and then top valve is shut and bottom valve remains open.

As test temperature is approached near to the fluid valve on the mold, the bottom valve (fluid valve) is closed. Closing the fluid valve too soon may generate enough pressure, as the cell is heating, to prevent/reduce the intended closure stress applied to the proppant slug. Closing the valve too late may allow loss of too much fluid from the slug by evaporation or boiling. The duplicate cylinders containing the sample are transferred to an oven preheated to the desired setpoint, for example, 200° F., and remain in the oven for 24 hours. Maintain stress and temperature during the cure time. Stress should be maintained +−10%. During the curing process in the oven, loose curable proppant particles become a consolidated mass. At the end of the 24 hours, the cylinders are removed, venting off pressure and fluid rapidly, and the approximately one inch by six inch consolidated slug sample is pressed from the cylinder. The sample is allowed to cool and air dry for about 24 hours, and cut (typically sawed) into compression slugs of length times diameter (L×D) of greater than 2:1, preferably about 2.5:1. Air drying is performed at a temperature of less than about 49° C. (120° F.). Typically, both ends of each slug are smoothed to give flat parallel surfaces and the slugs are cut to maintain a greater than 2:1 ratio of the length:diameter.

The compression slugs are mounted in a hydraulic press and force is applied between parallel platens at a rate of about 4000 lbs$_f$/minute until the slug breaks. For slugs with compressive strength less than 500 psi, use a loading rate of about 1000 lbs$_f$/minute. The force required to break the slug is recorded, replicates are documented, and the compressive strength for each sample is calculated using the formula below. An average of the replicates is used to define the value for this resin coated proppant sample. The formula for calculation is Fc=(4*Fg)/((p*d$^2$)*(0.88+(0.24d/h))) with Fc=compressive strength (psi), Fg=hydraulic gauge reading (lb force), p=pi (3.14), d=diameter of the slug (inches), and h=length of slug (inches).

Compressive strength of the slugs is determined using a hydraulic press, such as a Carver Hydraulic Press, model #3912, Wabash, Ind. Typical compressive strengths of proppants of the present invention range from about 10 to about 100 psi or higher. However, the reproducibility of the UCS test is probably +/−10% at best. It is also noted that the Compressive Strength Test can be used to indicate if a coating is cured or curable. No bonding, or no consolidation of the coated particles, following wet compression at 1000 psi at 200° F. for a period of as much as 24 hours, indicates a cured material.

The molded specimens made according to this procedure are suitable for measurement of Brazilian tensile strength and/or unconfined compressive strength (UCS) test of ASTM D 2938-91 or ASTM D 2938-95 Standard Test Method for Unconfined Compressive Strength of Intact Rock Core Specimens. For compressive strength measurements, the test specimen shall be cut to a length of at least 2.25 inches (57.2 mm), a length to diameter ratio of at least 2 to 1, and then broken according to ASTM D 2938-91 Standard Test Method for Unconfined Compressive Strength of Intact Rock Core Specimens. For Brazilian tensile strength measurements, the test specimen shall be cut to a length of at least 0.56 inch (14.2 mm) but not more than 0.85 inch (21.6 mm), a length to diameter ratio of at least 0.5-0.75 to 1, according to ASTM D 3967-92 Standard Test Method for Splitting Tensile Strength of Intact Rock Core Specimens.

Sample 2-8 were prepared according to following procedure: 8 g of a selected adhesive made by using the typical synthetic procedure in Example 1 by replacing TOFA with S-rosin (CAS number 8050-09-7), was dissolved in 8 g of a selected solvent system listed in Table 1 at room temperature. S-Rosin is a rosin product commercially available from Ingevity Inc. of Charleston, S.C.

TABLE 1

| Solvent used for each sample (all with 10% methanol)* |  |
|---|---|
| sample 2 | 40DPM/50A150 |
| sample 3 | 50DPM/40A150 |
| sample 4 | 60DPM/30A150 |
| sample 5 | 65DPM/25A150 |
| sample 6 | 70DPM/20A150 |
| sample 7 | 75DPM/15A150 |

*DPM = dipropylenemethyl ether, A150 is ExxonMobil's Aromatic 150 solvent

Sample 2-8 were coated and loaded to the UCS cell according to following procedure: To a beaker containing 200 g 40/70 mesh Hi-crush sand was added 4 g (2%) of the above liquid, and resulting mix was stirred with a spatula vigorously for 5 to 10 minutes, or until the chemical is evenly coated on the sand surface (no visible chemical drop left). To the beaker was added 139 g of 2% KCl solution, and the resulting mixture was mixed vigorously with a spatula for 5 to 10 minutes. The sand slurry was then loaded on a UCS cell following the general loading procedure described above. The cell is then transferred to an oven and maintained at 200° F. for 24 h. The cell was then moved from the oven, and the core extracted.

Figure 3:
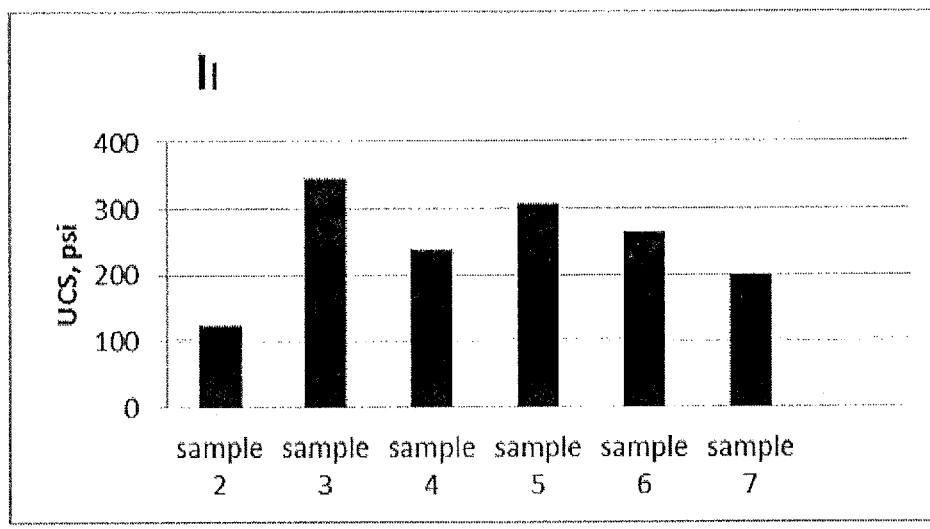
FIG. 3 is a graph showing the impact of solvent on UCS value of the coated proppant core.

The core was then dried in a dehumidifying chamber for at least 24 hours (h) before measuring the unconfined compressive strength. The results are shown on FIG. 3 (FIG. 3).

For conventional resin coated proppant, the UCS value is normally in 50-300 scale. It is obvious that adhesives of this invention provide outstanding UCS value, which is comparable to some resin coated proppants. Also, the solvent system seems to have impact to the UCS value, sample 3 and 5 seem to be the best one.

Example 4. Curable Coating for Flow-Back Control and Consolidation of Proppant Pack—Formulation and Evaluation of Unconfined Compressive Strength of Cross-Linked Resin The active adhesive compositions of sample 8, 9, 10, and 11 were made by using the typical synthetic procedure in Example 1 with the stoichiometry as shown in Table 2.

TABLE 2

| Sample Molar Ratios | |
|---|---|
| Samples | Molar Ratios |
| 8 | terephthalic acid:DETA:rosin = 1:2:2 |
| 9 | terephthalic acid:DETA:rosin = 2:3.5:3 |
| 10 | terephthalic acid:DETA:rosin:TOFA = 1:2:1:1 |
| 11 | terephthalic acid:DETA:TOFA = 1:2:2 |

Sample 8, 9, 10, and 11 are formulated according to the following procedure. 8 g of a selected adhesive was dissolved in 8 g of a solvent combination (25% Aromatic 150 and 75% dipropylene glycol methyl ether) at room temperature. 2 g of Hexion's Epon 828 was added to the solution, and the resulting mixture was mixed with a spatula thoroughly to a homogeneous liquid.

To a beaker containing 200 g 40/70 mesh Hi-crush sand was added 4 g (2%) of the above liquid, and resulting mix was stirred with a spatula vigorously for 5 to 10 minutes, or until the chemical is evenly coated on the sand surface (no visible chemical drop left). To the beaker was added 139 g of 2% KCl solution, and the resulting mixture was mixed vigorously with a spatula for 5 to 10 minutes. The sand slurry was then loaded on a UCS cell following the general loading procedure described above. The cell is then transferred to an oven and maintained at 200° F. for 24 h. The cell was then moved from the oven, and the core extracted. The core was then dried in a dehumidifying chamber for at least 24 h before measuring the unconfined compressive strength. The results are shown on FIG. 4 (FIG. 4).

Figure 4:
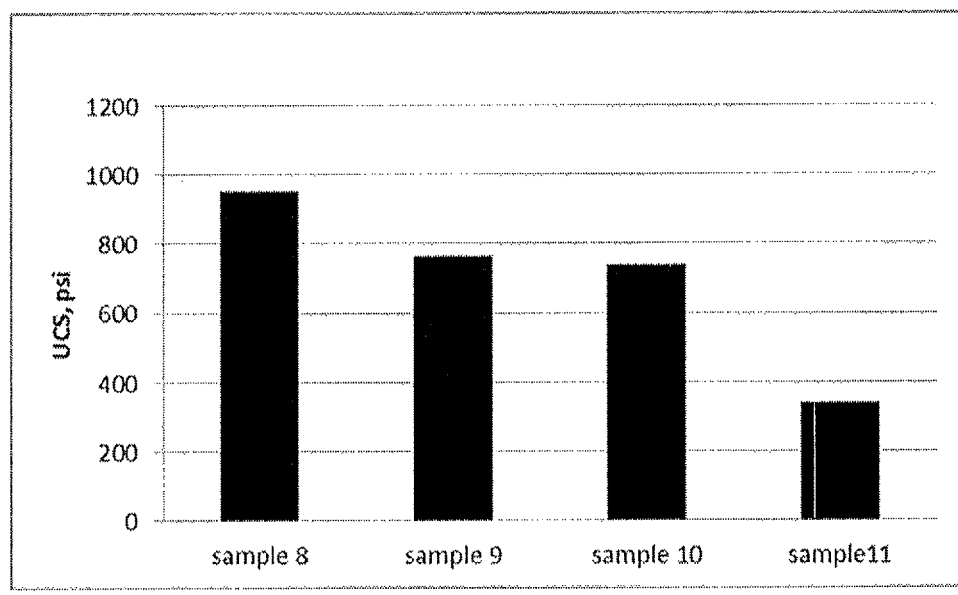
FIG. 4 is a graph showing the UCS value of proppant core coated with cross-linked adhesive of this invention.

From FIG. 4, samples 8 and 9 provided better UCS values than Sample 11. It indicates rosin derivative is better than TOFA for UCS. However, when the adhesive was made with the mixture of rosin and TOFA (Sample 10). The UCS value is as good as sample 8 and 9. Generally, the four samples all provided outstanding UCS values.

Example 5. Performance of Chemicals of this Invention on Dust Control

The following experiments are for the demonstration of dust Control property of the adhesives of this invention
Ball Milling Test Method.

The dust levels of particles can be determined for particles subjected to a Ball Mill Test using a Turbidity Test. The particles are processed in the Ball Mill as follows. Into a standard eight inch ball mill, three ceramic balls (about 2 inches in diameter) are added along with 150 grams of the material to be tested. This combination is closed and placed on the rollers at about 50 rpm. The unit is stopped at specific times, samples removed, and subjected to the Turbidity Test as described below. After being subjected to the Ball Mill Test, the particles are subjected to a Turbidity Test as follows.
Turbidity Test Method.

Equipment used was a Hach Model 2100P turbidity meter with Gelex secondary standards and a Thermolyne Maxi-Mix 1 vortex mixer. The turbidity test was performed on 5 gram samples using as reagents of 15 grams of deionized/distilled water, doped with 0.1% FSO surfactant or FS-34 surfactant and 15 grams of DuPont™ ZONYL® FSO Fluorosurfactant or DuPont™ Capstone® FS-34.

Samples are measured according to the following steps: 1) Weigh 5.00 grams of the sample to be measured and place this in the cell from step 4 above. 2) Using the Vortex mixer, agitate the sample/water mixture for 30 seconds, 3) Clean the outside of the cell with lint free paper. 4) Place the sample/cell back into the turbidimeter and read the turbidity, 30 seconds after the Vortex mixing ended, 5) Record the turbidity in NTU units for this sample as "dust content."

The Ball Mill Test is assumed to simulate the likely amount of dust generated during transportation and pneumatic transfer. The amount of dust generated is measured via the Turbidity Test.

Unconfined Compressive Strength was done according to the general procedure described in previous paragraph.

Test Data is shown below in the Table 3.

Sample 12 was formed by dissolving the reaction product of terephthalic acid, diethylenetriamine and TOFA in an equal amount of a solvent mixture (25% aromatic 150 (heavy aromatic naphtha from ExxonMobil), and 40% 2,2-dimethyl-4-hydroxymethyl-1,3-dioxolane (Solvay SL 191) and 10% methanol)

Sample 13 was formed by dissolving the reaction product of terephthalic acid, diethylenetriamine and TOFA in an equal amount of a solvent mixture (25% aromatic 150 (heavy aromatic naphtha from ExxonMobil), and 75% polyglyme (polyglycol methyl ether)).

All below experiments follow the general procedure described in next paragraph with variations at loading dosage, and coating temperature.

For ambient and above temperature coating examples, the process employs 1 kg of 100 mesh sand with a single layer coating of Sample 12. The sand was transferred to a Littleford lab mixer. The mixer agitator was started and the sand was heated to a temperature of 70° F. and maintained at that temperature with a heat gun. Once the temperature was achieved 2 grams of Sample A was added at the start of the mixing process. After a total mixing time of 4 minutes and 15 seconds the mixing was stopped, the coated material was passed through a no. 30 US mesh sieve, then Ball Milling test was performed on the coated material to check for dust suppression and the product was tested for 24 hour UCS bond strength at 1000 psi and 200° F.

For below ambient temperature coating examples, the process employs 1 kg of 100 mesh sand with a single layer coating of Sample 13. The sand was chilled in a freezer to 33° F. for 24 hours and transferred to a Littleford lab mixer. The mixer agitator was started and 4 grams of Sample 1 was added at the start of the mixing process. After a total mixing time of 4 minutes and 15 seconds the mixing was stopped, the coated material was passed through a no. 30 US mesh sieve, then Turbidity test was performed on the coated material to check for dust suppression and the product was tested for 24 hour UCS bond strength at 1000 psi and 200° F.

TABLE 3

Test Results of Samples 12 and 13

| Entry | Sample | Percentage of Coating (g/100 g sand) | Coating Temperature (° F.) | Turbidity (NTU) for Ball Milling Times (min) | | | | | UCS (U/C) U/C |
|---|---|---|---|---|---|---|---|---|---|
| | | | | 0 (min) | 15 (min) | 30 (min) | 45 (min) | 60 (min) | |
| 1 | Control | 0 | 70 | 386 | 678 | 1156 | 1674 | 1904 | U |
| 2 | Sample 12 | 0.2 | 70 | 16.1 | 242 | 391 | 643 | 983 | C |
| 3 | Sample 12 | 0.2 | 130 | 11.8 | 144 | 287 | 512 | 843 | U |
| 4 | Sample 12 | 0.4 | 70 | 22.3 | 57.1 | 133 | 99.3 | 135 | C |
| 5 | Sample 12 | 0.4 | 130 | 11.9 | 81.0 | 468 | 888 | 1000 | C |
| 6 | Sample 12 | 0.6 | 70 | 27.4 | 43.2 | 53.1 | 69.5 | 89.9 | C |
| 7 | Sample 12 | 0.6 | 130 | 14.0 | 81.5 | 174 | 269 | 167 | C |
| 8 | Sample 12 | 0.4 | 33 | 17.7 | N/A | N/A | N/A | N/A | U |
| 9 | Sample 12 | 0.1 | 70 | 26.0 | 360 | 846 | 1000 | 1000 | C |
| 10 | Sample 13 | 0.1 | 70 | 40.6 | 287 | 638 | 1000 | 1000 | C |
| 11 | Sample 13 | 0.2 | 70 | 43.1 | 198 | 340 | 788 | 1000 | C |
| 12 | Sample 13 | 0.4 | 130 | 28.0 | 36.5 | 51.4 | 112 | 121 | C |
| 13 | Sample 13 | 0.4 | 3 | 20.5 | N/A | N/A | N/A | N/A | C |

U = Unconsolidated UCS core,
C = Consolidated UCS core, but no measurable strength Table 3 illustrates test results of the examples identified before the table, and a sample of uncoated 100-mesh sand used as a control. The columns labeled; Turbidity (NTU) for Ball Milling Times (min), illustrated different dust levels of the particles when subjected to a ball milling over time. The API turbidity requirement is 250 NTU. Prior to ball mill testing, the initial turbidity of the control, uncoated 100-mesh sand, exceeded the API turbidity requirement of 250 NTU. When the control was ball milled the dust levels increased with time. The turbidity of the control nearly tripled after 30 minutes, and after 60 minutes, the turbidity was nearly five times the initial turbidity. The Ball Mill data showed how well the dust levels minimized with the addition of a coating. Entry 4 and 12 are good examples in showing how the coating reduce the turbidity of 100-mesh sand and kept the turbidity relatively low (below API turbidity requirement) even after subjected to the ball mill for 60 minutes. The Ball Mill Tests were an attempt to simulate the effects of the mechanical abrasion associated with proppant transfer such as trucking, rail, belt travel, and pneumatic transfer. Another column labeled; UCS (U/C), illustrated consolidation. The sample would or would not consolidate under conditions explained earlier in section; Unconfined Compressive Strength. Many of the coated samples consolidated and could possibly conclude that the sample might of demonstrated particle-to-particle bonding and could offer flow-back control for downhole conditions, unlike the control.

Table 3 illustrates some of the test results found from the examples that are identified before the table and uncoated 100 mesh sand for a control. The first group of test results labeled; Turbidity (NTU), showed the different dust levels of the particles for particles subjected to a Ball Mill Test using a Turbidity Test for coated and uncoated examples. The table also shows how the dust levels could possibly change over a period of time when subjected to a Ball Mill. A Turbidity Test is used to measure that change from the initial; which is prior to Ball Milling, and to 60 minutes of Ball Milling. A reading would be taken in 15 minute increments to display a trend. From this test you could possibly conclude how well a coated or uncoated example would minimize the dust levels through harsh handling and transport of the sample. Additional dust can be generated when product is transported to its final destination due to mechanical abrasion. Ball mill tests were conducted in to simulate the effects of mechanical abrasion associated with product transfer such as trucking, rail, belt travel, and pneumatic transfer. The API turbidity requirement is 250 NTU, and prior to ball mill testing, the initial turbidity of the uncoated 100 mesh sand exceeded the API turbidity requirement of 250 NTU. During the ball mill testing, the turbidity of the uncoated 100 mesh sand nearly tripled after 30 minutes. After 60 minutes of ball milling, the turbidity of the uncoated 100 mesh sand was nearly five times the initial turbidity. Examples 3 and 11 are exemplary in that the turbidity remains relatively low even after being subjected to the ball mill test for 60 minutes. The second group of data results labeled; UCS, showed whether the example would consolidate under conditions explained earlier in section; Unconfined Compressive Strength. If the sample consolidated you could possibly conclude that the sample might demonstrate particle to particle bonding.

Example 6. Performance of Chemicals of this Invention on Dust Control

Preparation of sample: a sample manufactured by the same procedure as in example 1 with (50% in ethoxytriglycol) was used for the performance test. In this test, the dust amount generated by the samples (coated and uncoated) in a designated test protocol will be recorded by a using a DustTrak™ dust meter, commercially available from TSI incorporated of Shoreview, Minn.

Multiple coated sands were made using 100 mg, and 50 mg, and 0 mg of the above industrial sample. The coated sands were made by adding the above amounts to sand (100 g, 40/70 Unimin white sand) to give 0.10 wt. %, 0.050 wt. %, and 0.00 wt. % level of coating respectively. The coated samples were prepared by manually mixing the chemical with the sand for 5 min with a spatula. The samples were then tested in a dust meter (DustTrak™ dust meter from TSI) as shown in Table 4 below.

TABLE 4

| Coating, wt. % | Sucking flow rate 0.75 L/min Dust amount µg/m³ | Sucking flow rate 0.5 L/min Dust amount µg/m³ |
|---|---|---|
| 0 | 620 | 805 |
| 0.05 | 44.4 | 36 |
| 0.1 | 20.2 | 11 |

In this test, the dust meter continuously sucks dust-containing air containing the sample from a container and a dropping pipe. Here two flow rates (0.75 L/min, 0.5 L/min) were employed for the test. The dust amount in the sucked air is read by the meter as micro gram per cubic meter. As one can see from Table 4, even at 0.05% coating level, the composition reduces the dust level ten folds at both sucking flow rate.

Example 7: Flow-Back Control Proppant Pack Failure Flow Rate Test

This following example was performed by the API standard test Flow Back Test 400-16-12-15-02-F, with the following procedure.

The coating sample was prepared in following manner: a coating composition: 8 g of a selected adhesive made by using the typical synthetic procedure in Example 1 by replacing TOFA with S-rosin (CAS number 8050-09-7), was dissolved in 8 g solvent (2 g Aromatic 150 (ExxonMobil) plus 6 g ethoxytriglycol (Dow)). The sand sample was coated at 1.5 wt. % level with the resulting composition. The coated sand and the uncoated sand were then subject to the following test.

The flow back conductivity cell is loaded per ISO 13503-5 procedures. The zero-pack width is measured and recorded. The flow back conductivity cell is placed onto the press and the closure stress is increased to 1,000 psi. The temperature was increased to 90° F. to allow the resin coated sand to cure for 24 hours. After the 24-hour period was complete, Nitrogen flow begins to remove any fluid from the cell and to ensure that the proppant pack is dry. The Nitrogen Flow is then stopped and the end slot is removed to allow the sand to flow out of the flow back cell. The flow of Nitrogen is resumed beginning at 10 L/min and increased 10 L/min until proppant pack failure occurs (proppant comes out of the cell). This same process is repeated for the 40/70 frac sand.

The coated sand having 1.5 wt. % of adhesive composition, exhibited a failure flow rate at 0.0566 lbs/min nitrogen, while the raw sand exhibited a failure flow rate at 0.0075 lbs/min nitrogen. This example illustrates that the composition herein demonstrated a 7.5 times improvement over the uncoated sand.

Example 8: Compatibility Test

The sample to be tested is the material made in Example 1 prepared as follows. In a glass beaker, 1.0 g ethylene-vinylacetate copolymer (EVA, EVA 2850A from Celanese) and 1.0 g of the sample were heated to 120° C., and mixed manually with a spatula for 5 min. After cooled to room temperature, the mixed sample-EVA product (1:1 ratio) was broken manually. About 60 mg of the mixed sample-EVA product was used to run a thermal mechanic analysis (TMA) test along with an unmodified sample, and the EVA material. The TMA tests were done on a TA Q400 thermal mechanical analysis instrument. The heating procedure is: equilibrium at 25 C for 5 min—heating at 10° C./min rate until 200° C. EVA is a typical binder for hot melt adhesive.

The TMA test records the mechanic strength under heating condition. When there is phase transition, the sample will show mechanic strength change, and the machine will detect the change. It can accurately define the phase transitions at the temperature range of the test. Therefore, if two materials are not dissolved by each other, they will show their own phase transitions, which means they are not compatible. If two materials are dissolved by each other, they will form a homogenous system at molecular level, and the resulting material will have phase transitions different from their original compositions. So if two materials are mixed, and the TMA doesn't their original phase transitions, it means they form homogeneous new materials, in other words, the components are compatible. The non-mixed materials were also tested.

Once a phase transition occurs, the curve will show an absorption peak. If there is another phase transition, it will show another absorption peak. If the two materials are not blended in molecular level, there will be multi-phases that have different thermal mechanical properties, and they will show phase transition at different temperature. If only one transition temperature is observed, and the temperature is different from any of the original temperature of the original components, that means a new phase is formed at molecular level. The tackifier serves as solvent for the polymer binder (normally poor mobility due to high molecular weight), provides tackiness (stickiness) for the adhesives, and help improve the wettability of the adhesive. So a tackifier is normally small molecular compound with high softening point, and stickiness An analysis of the TMA test illustrates there is only one phase transition, and the indication of only one phase transition clearly demonstrates that the two products have molecular level blending, forming a homogeneous solution. In other words, they are completely compatible, and compatibility is the base for a compound to be a tackifier.

Example 9: Pressure Sensitive Adhesive Properties Test

Pressure sensitive adhesive properties of viscoelastic materials were evaluated by a special method that was developed for this purpose. In the test force as a function of time is measured for a compression/retraction type technique to evaluate pressure sensitive adhesive properties. A portion of Sample 11 was heated to 120° C. and poured onto a 100 mm think glass plate as substrate, which was clamped to the pedestal of a Brookfield CT3 Texture Analyzer, equipped with a 21 mm diameter aluminum probe. The instrument was programmed to lower the probe at a rate of 0.02 mm s$^{-1}$ onto the sample and to hold position for a period of 10 seconds, as soon as a force of 1 Newton is registered and then to pull the probe from the sample at a rate of 0.5 mm s$^{-1}$. The initial gradual increase in force is associated with the probe approaching the sample surface to make contact with increasing force up to the target value of 1N, where it holds position for 10 seconds. Both surfaces of the aluminum probe and glass substrate are fully wetted by the sample at this stage, before the probe is retracted from the adhesive junction. The maximum force at break is used as quantitative indication of adhesive properties, compared with the initial applied force. The onset of the retraction step is noted by the fast increase in negative force which ends at the failure point at −7.6N at approximately 145 seconds, where the high negative force decline to a zero force value over a short additional distance of movement as the adhesive sample is pulled apart in strings. Subsequent inspection of the probe and substrate surfaces showed a cohesive failure mechanism with both surfaces equally wetted with sample residue.

From the test, the "negative force" is indicative of adhesive action, and an increasing measured negative force indicates increasing performance as adhesive. Also the ratio of (−7.6:1) of maximum tension observed to original force applied is indicative of PSA performance with higher ratios indicating increasing PSA performance. Having the tension at break exceeding the original pressure applied to an approximate 7 times (7.6:1); is indicative of a very good pressure sensitive adhesive. The observation of a negative force indicates adhesion/"stickiness" and higher forces at break (maximum negative force) indicate improving adhesive performance, which is also referred to as "adhesive force". Additionally, the ratio of input pressure applied; compared to tension (force at break) observed is an additional indication of pressure sensitive adhesive performance. A high tension at break as result of a low applied pressure indicates high performance as a pressure sensitive adhesive. On the other hand; if a high applied pressure results in a low observed tension at break; this will be low/poor performance PSA. Thus the example shows that the adhesive composition is a pressure sensitive adhesive and also indicates high performance as a pressure sensitive adhesive.

Example 10: Flow Rate Tests

The additive composition to coat the proppant substrates is prepared as follows. The active compound is synthesized by using the procedure of Example 1 with rosin, 148 g, 0.5 mol (rosin-S commercially available from Ingevity) instead of TOFA. The active compound is then dissolved in a solvent combination of Aromatic 150 and a polyether to give a 50% solution, which is directly used without further modification.

The instrument used to measure the flow rate is a graduated glass column (1.5 inch inner diameter, and column body is 18 inches long) with removable reservoirs. The column was packed with designated amount of sand either raw sand or sand coated as described herein. The flow rates were measured according to the following procedure.

910 g of raw sand, or a coated sand as described herein, is packed into a column having the dimensions of 45.7 cm height and 3.8 cm inner diameter. A piece of glass wool is placed into the column, and the glass wool is pushed to the stopcock to keep sand from escaping with the fluid. The mass of 2 empty beakers is weighed and recorded. One beaker is used to collect one pore volume of water (600 ml beaker) and the other to collect one pore volume of isopar L (400 ml beaker). 534 g of DI water is weighed and placed in a plastic 100 ml beaker, which beaker is attach to the "water only" reservoir of the column. The stopcock is opened and the DI water is poured into the column. One pore volume of water (approximately 217 ml) is collected in the 600 ml beaker. The water level is the column is checked to make sure water is still covering the pack and the stopcock is closed. The column is then packed to remove air pockets. The free water sitting above the pack is drained into the 600 mL beaker and the stop cock is closed as water hits the top of the pack. The length of the pack is measured, such as by a tape measure, which is typically 46-48 cm in length in the column used in the present experiment.

Next, 432.8 g of Isopar L oil was placed in a plastic 1000 mL beaker and attached to the "Oil Only" reservoir to the column. The Isopar L oil is poured into the column. The stopcock is opened and the water being displaced by Isopar L oil is collected (in the 600 mL beaker). The oil/water interface is observed and the stopcock is closed before oil starts coming out. The beaker and water are then weighed.

A new pre-weighed empty beaker (400 mL) is then used to collect one pore volume of Isopar L oil. This is approximately 225 mL (in a 400 mL beaker). The beaker, Isopar oil, and residual water are then weighed. The oil and residual water are separated using the separatory funnel to obtain the additional water that is being displaced. The mass of water is measured for use in calculating the residual water left in the pack.

Once the one pore volume of Isopar L is collected, the flow test is performed. However, before the flow test is started, the Isopar L oil level is measured so that the height of the head part is 9 cm (from the top of the pack), and if not, additional oil is added (and mass recorded) to meet the desired level.

Using a beaker of a known mass, the Isopar L oil is collected until the oil reaches the top of the pack. The collection time in minutes is recorded. The total mass of Isopar L collected is calculated and converted into a volume measurement. The flow rate is obtained by dividing the volume collected by minutes (t). If there is any water present in the oil. Separate using separatory funnel. The mass, volume, and flow rate by water through the testing system is calculated the same as for Isopar L oil.

The test was performed three time for a 1.5 wt % coating of the adhesive composition on the proppant substrate (Unimin 40/70 sand), a 0.25 wt. % coating, and no coating proppant, and the data is listed below. The calculated oil flow rates were recorded as follows in Table 1.

TABLE 1

| Sample | No coating (Control 1) | 1.5 wt. % coating | No coating (Control 2) | 0.25 wt. % coating |
|---|---|---|---|---|
| Oil flow rate in ml/minute | 7.2 | 24.85 | 7.4 | 14.1 |
| Water flow rate in ml/minute | 44.5 | 79.96 | N/A | N/A |

From Table 1, the oil flow rate through the column sand pack using the 1.5 wt. % coating of the adhesive/additive composition described herein is increased to about 3.5 times that of the Control samples using an untreated "raw" sand pack with no coating of the adhesive/additive composition described herein. Even at a reduced amount of coating materials, oil flow rate through the column sand pack using the 0.25 wt. %, coating of the adhesive/additive composition described herein is increased to about two (2) times that of the Control samples using an untreated "raw" sand pack with no coating of the adhesive/additive composition described herein.

The increased oil flow rate is believed to be attributed to two factors. First, an increase in the void volume increase of the treated pack (fines trapped by big particles) as compared to the untreated pack that allows more oil flow there through. Secondly, the coating of the adhesive/additive composition described herein provides for a surface modification that favors oil flow. In order to estimate the contribution of the second factor, water flow rates of treated and raw sand pack are also measured. From Table 1, one can see water flow rate increase from raw sand pack to treated sand pack is about 1.8 times. Therefore, the oil flow rate increase that is due to the surface modification is about 1.9 times.

While the foregoing is directed to embodiments of the present disclosure, other and further embodiments of the disclosure may be devised without departing from the basic scope thereof, and the scope thereof is determined by the claims that follow.

What is claimed is:

1. A fracturing fluid composition, comprising:
a fracturing fluid; and
an additive composition comprising:
a reaction product comprising:
an adduct or product comprising from about 25 wt. % to about 96 wt. % of the additive composition, and the adduct or product comprising:
a diacid comprising from about 40 wt. % to about 90 wt. % of the adduct or product, and the diacid is selected from the group consisting of an aromatic diacid, an aliphatic diacid with an aromatic group, and combinations thereof; and
a polyamine comprising from about 10 wt. % to about 60 wt % of the adduct or product, and the polyamine is selected from the group consisting of triamines, tetramines, and combinations thereof; and
one or more compounds comprising from about 4 wt. % to about 75 wt. % of the additive composition, the one or more compounds are selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof, the reaction product comprising

wherein:
n is 1 to 10,
R1 is a branched aliphatic acid having C2-C26 alkyl group,
R2 is a branched aliphatic acid having C2-C26 alkyl group, a cyclic aliphatic acid with C7-C30 cyclic aliphatic group, or a linear aliphatic acid having C2-C26 alkyl group,
dAm comprises a polyamine, and
dAc comprises a diacid; and
wherein a total wt. % of the additive composition is 100 wt %.

2. The fracturing fluid composition of claim 1, wherein the additive composition comprises from 0.01 wt. % to 10 wt. % of the fracturing fluid composition.

3. The fracturing fluid composition of claim 1, wherein n of the reaction product is 1 to 5.

4. The fracturing fluid composition of claim 1, wherein the fracturing fluid composition further comprises a solvent selected from the group consisting of aromatic solvents, ethers, alcohols, and water.

5. The fracturing fluid composition of claim 1, further comprising a cross-linking agent.

6. The fracturing fluid composition of claim 1, wherein the fracturing fluid comprises water and optionally, one or more components selected from the group consisting of a gelling agent, a friction reducer, an acid, a surfactant, a crosslinker, a biocide, a scale inhibitor, a non-emulsifier, a breaker, a proppant water, and combinations thereof.

7. The fracturing fluid composition of claim 1, wherein the fracturing fluid composition comprises water and optionally, one or more components selected from the group of a gelling agent, a friction reducer, an acid, a surfactant, a crosslinker, a biocide, a scale inhibitor, a non-emulsifier, a breaker, a proppant water, and combinations thereof.

8. The fracturing fluid composition of claim 1, wherein the polyamine is selected from the group consisting of diethylenetriamine, triethylenetetraamine polyethertriamine, and combinations thereof.

9. The fracturing fluid composition of claim 1, wherein:
the polyamine comprises diethylenetriamine,
the branched aliphatic acid having C2-C26 alkyl group comprises versatic acid,
when the one or more compounds includes the cyclic aliphatic acid with C7-C30 cyclic aliphatic group, the cyclic aliphatic acid with C7-C30 cyclic aliphatic group comprises rosin, and
when the one or more compounds includes the linear aliphatic acid having C2-C26 alkyl group, the linear aliphatic acid having C2-C26 alkyl group comprises tall oil fatty acid (TOFA).

10. The fracturing fluid composition of claim 1, wherein the linear aliphatic acid having C2-C26 alkyl group comprises any plant and animal fatty acid selected from the group consisting of tall oil fatty acid, and fatty acids made from chicken fat, lard, beef tallow, canola oil, flaxseed oil, sunflower oil, corn oil, olive oil, sesame oil, peanut oil, cottonseed oil, palm oil, butter, and cocoa butter, palm kernel oil, coconut oil, and combinations thereof.

11. The fracturing fluid composition of claim 1, wherein the cyclic aliphatic acid with C7-C30 cyclic aliphatic group is selected from the group consisting of rosin, naphthenic acid, and combinations thereof.

* * * * *